US004001740B2

United States Statutory Invention Registration [19]

[11] Reg. Number: H1740

Powell

[45] Published: Jul. 7, 1998

[54] SYNCHRONIZED ROTATING PRISM AND CCD ELECTRICAL READOUT COLOR CAMERA

[75] Inventor: Rodney M. Powell, Fort Walton Beach, Fla.

[73] Assignee: The United States of America as represented by the Secretary of the Air Force, Washington, D.C.

[21] Appl. No.: 907,278

[22] Filed: Jul. 1, 1992

[51] Int. Cl.[6] ..... H04N 5/228

[52] U.S. Cl. ..... 348/207; 348/241; 348/248; 348/249; 348/311; 348/317

[58] Field of Search ..... 358/213.24, 213.25, 358/213.26, 44, 55, 213.27, 218, 219, 213.28; 359/211, 212, 438; 348/98, 167, 168, 195, 337, 340, 345, 248, 249, 317, 320, 322, 324; H04N 9/040, 5/335

[56] References Cited

U.S. PATENT DOCUMENTS

| | | | |
|---|---|---|---|
| 3,617,623 | 11/1971 | Ross | 358/517 |
| 3,746,421 | 7/1973 | Yoder | 359/211 |
| 4,090,774 | 5/1978 | Zeifang | 359/211 |
| 4,268,119 | 5/1981 | Hartman | 359/634 |
| 4,280,141 | 7/1981 | McCann et al. | 358/213 |
| 4,314,275 | 2/1982 | Chapman | 348/164 |
| 4,327,377 | 4/1982 | Takken | 348/295 |
| 4,573,078 | 2/1986 | Rentsch et al. | 358/213 |
| 4,598,321 | 7/1986 | Elabd et al. | 358/213 |
| 4,641,038 | 2/1987 | Baker | 280/578 |
| 4,799,108 | 1/1989 | Gerner | 358/213.26 |
| 4,851,914 | 7/1989 | Pfanhouser et al. | 358/213.19 |
| 4,875,098 | 10/1989 | Yamamoto et al. | 348/250 |
| 4,922,337 | 5/1990 | Hunt et al. | 358/101 |
| 4,949,172 | 8/1990 | Hunt | 358/101 |
| 4,972,255 | 11/1990 | Suzuki | 358/213.18 |
| 5,063,460 | 11/1991 | Mutze | 358/209 |
| 5,144,444 | 9/1992 | MacLean | 358/209 |
| 5,155,597 | 10/1992 | Lareau et al. | 358/213.14 |
| 5,173,748 | 12/1992 | Bilhorn | 356/328 |
| 5,187,569 | 2/1993 | Tani | 358/50 |
| 5,229,857 | 7/1993 | Taniji | 358/213.23 |

FOREIGN PATENT DOCUMENTS

| | | | |
|---|---|---|---|
| 0428884 | 5/1991 | European Pat. Off. | H04N 9/04 |
| 61-236282 | 10/1986 | Japan | H04N 5/335 |
| 4252677 | 8/1992 | Japan | H04N 5/335 |

OTHER PUBLICATIONS

R.R. Whitlock et al. "Streak and Framing Camera Designs using Surface Acoustic Wave Charge-Transfer Devices", Optical Engineering, vol. 25, No. 12, Dec. 1986, pp. 1267–1277.

*Primary Examiner*—Bernarr E. Gregory
*Attorney, Agent, or Firm*—Gerald B. Hollins; Thomas L. Kundert

[57] ABSTRACT

A video camera system combining a charge coupled device (CCD) with a rotating prism optical element is disclosed. The rotating prism optical element moves an optical image on the transducer surface of the CCD array in precise synchronism with a CCD array clock which is transferring charge between transducer sites of the array. Since charge transfer occurs in synchronism with image movement, the exposure of transducer sites to image blurring or smearing additional optical energy is eliminated. The disclosed apparatus is particularly useful for high-speed, high-resolution, military, possibly airborne, camera systems. The invention also contemplates resolution of color images, with the use of color selective filters over adjacent columns of the CCD imaging array. The invention additionally contemplates utilizing a rotating prism optical element with other types of detectors.

17 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SYNCHRONIZED ROTATING PRISM AND CCD ELECTRICAL READOUT COLOR CAMERA

RIGHTS OF THE GOVERNMENT

The invention described herein may be manufactured and used by or for the Government of the United States for all governmental purposes without the payment of any royalty.

BACKGROUND OF THE INVENTION

This invention relates to the field of solid state video cameras of the charge-coupled-device (CCD) variety.

The unintended introduction of charge transfer related "smear" into video images obtained from charged coupled device (CCD) arrays has been recognized in the CCD art. This phenomenon is, for example, considered in U.S. Pat. No. 4,010,319. Generally, smear occurs when one or more of the sites involved in a site-to-site transfer of electronic charge in a CCD array is also exposed to optical input energy during the charge transfer process. Clearly, any change in the "correct" charge quantity already achieved from an image pixel exposure is an undesirable addition to the charge transferring process and will cause degradation of the image produced by the CCD array. In U.S. Pat. No. 4,598,321, moreover, the smear phenomenon is concisely described in the language, "Transfer smear arises when the image register is exposed to radiation during the transfer of charge packets from image register to field storage register, because the photo response to the image at this time is misregistered with respect to the integrated photo responses being transferred."

Previously the effects of charge transfer smear have been diminished in a video camera by mechanical shuttering arrangements in which the input optical image is removed from the CCD array during charge transfer intervals. Previous smear improvement efforts have also included the use of fast charge readout rates wherein the charge transfer event occurs much faster than the exposure period of an optical-to-electrical transducer site in the CCD array and thereby the effect of new optical energy charge on the transferred charge quantity is minimized.

Both of these prior arrangements however, are subject to undesirable difficulties. The mechanical shuttering systems for example are subject to physical instability especially at high frame rate operating speeds and are less than instantaneous in achieving shutoff of the optical image. "Electronic shuttering" readout during a time period shorter than the exposure time is also difficult to accomplish at high frame rates because the readout rate is bandwidth limited by the electronic circuitry employed.

The patent art shows several examples of charge coupled device (CCD) arrays used in imaging devices; examples of a general background interest with respect to the present invention. Included in this art is the U.S. Pat. No. 4,799,108 of Rudolf Gerner, which is concerned with a method for recording and storing images in rapid sequence. In the Gerner apparatus, a frame transfer CCD array normally used for image reception purposes is divided into a plurality of areas, only one of which is used for image reception in the high-speed recording and storing mode of operation. The remainder areas are used as high-speed memory arrays capable of storing a plurality of sequential images eventually read out on a line-by-line basis by a register portion of the CCD array. It is also interesting that the Gerner patent mentions the earlier high-speed photography usage of rotating prism cameras and rotating drums—as are used for high-speed photography up to the range of one million pictures per second. Nothing in the Gerner patent teaches the use of a rotating prism with an electronic imaging system, however.

Also included in this patent art is the U.S. Pat. No. 4,573,078 of Rentsch et al which is concerned with a method for operating a CCD imager of the field transfer type and wherein a signal delay and comparison sequence is employed to provide indications of transient phenomena in one signal field not present in another signal field. The Rentsch et al invention is especially useful in earth satellite camera systems detecting the presence of lightning flashes.

Also included in this art is the U.S. Pat. No. 4,280,141 of McCann et al which is concerned with charge transfer devices used as a time delay and integration-capable detector. Selected clock voltages are used by McCann et al to cause charge signal flow in the same or opposed directions of the array in order to form a selective electronic exposure control and to control the variable time delay and integration functions of the array. The McCann et al apparatus also contemplates use of the array in a moving platform such as a satellite—which provides scanning in one orthogonal direction, plus a scanning mirror which provides nod and sweep scanning in the other orthogonal direction.

This art also includes the U.S. Pat. No. 4,598,321 of Elabd et al which is concerned with a CCD image apparatus wherein the image array is partitioned for simultaneous charge transfers in opposing directions in order that the field transfer time for the apparatus be reduced.

This art also includes the U.S. Pat. No. 4,949,172 of Hunt et al which concerns the readout of a CCD array in synchronism with movement of an object in the field of view.

These patent references indicate the use of charge coupled device (CCD) arrays in a variety of signal processing arrangements that are of general background interest with respect to the present invention. None of these references, however, is able to provide the advantages of a moving optical image that is synchronized with the CCD readout and used in conjunction with any type of photosensitive detector, whether singular or plural, as is taught by the present invention.

SUMMARY OF THE INVENTION

The present invention combines a charge coupled device array with a movable optical element and with CCD device readout that is synchronized with movement of the optical element and movement of the optical image. The optical energy comprising a particular point in a received optical image in the invention is exposed to a plurality of CCD charge generating sites in sequence so that the accumulated charge read from a final site location in each column of the CCD is a summation of the charge generated in each site of the array column. This final quantity of charge is also free of smear effect charge quantities by way of the synchronized optical element and site-to-site transfer. The present invention also combines a linear array of detectors or a single detector (of any type of photosensitive detector) with a movable optical element. In this arrangement, synchronism with movement of the optical element and image is not necessary and readout can be a continuous analog readout of each site or a sampled readout of each site.

It is an object of the present invention therefore, to combine the desirable properties of a charge coupled device, linear array or single detector with the benefits of a moving optical element apparatus.

It is another object of the invention to combine a rotating optical prism with a detector charge coupled device array.

It is another object of the invention to synchronize the readout of electrical signals from a charge coupled device with a mechanical displacement movement of the input optical image.

It is another object of the invention to provide an improved video camera apparatus which combines a rotating optical prism with a CCD array, linear array or single detector.

It is another object of the invention to provide a video camera apparatus wherein each pixel of an optical image achieves charge accumulation at a plurality of column organized sites in a CCD array.

It is another object of the invention to provide a video camera apparatus in which small differences or nonuniformities in individual transducer sites of a CCD array are minimized in effect.

It is another object of the invention to provide the video camera of the preceding objects which may also be of a color detecting and transmitting capability.

Additional objects and features of the invention will be understood from the following description and claims and from the accompanying drawings.

These and other objects of the invention are achieved by: the method for fabricating electrical signals representing an optical input image comprising the steps of: focusing the optical input onto a photosensitive portion of a charge coupled device array, the photosensitive portion comprising a plurality of columns of optical-to-electrical signal transducer sites, moving the focused image along the transducer sites in the columns toward an electrical signal readout site portion for each column, transferring transduced optical signal generated quantums of electrical charge representing pixels of the optical input image between adjacent sites in the columns, the transferring progressing toward the electrical signal readout sites in synchronism with the image moving, reading the electrical signals from the readout sites in each column in predetermined order and processing said electrical signals into a predetermined output format.

DETAILED DESCRIPTION

Figure 1:
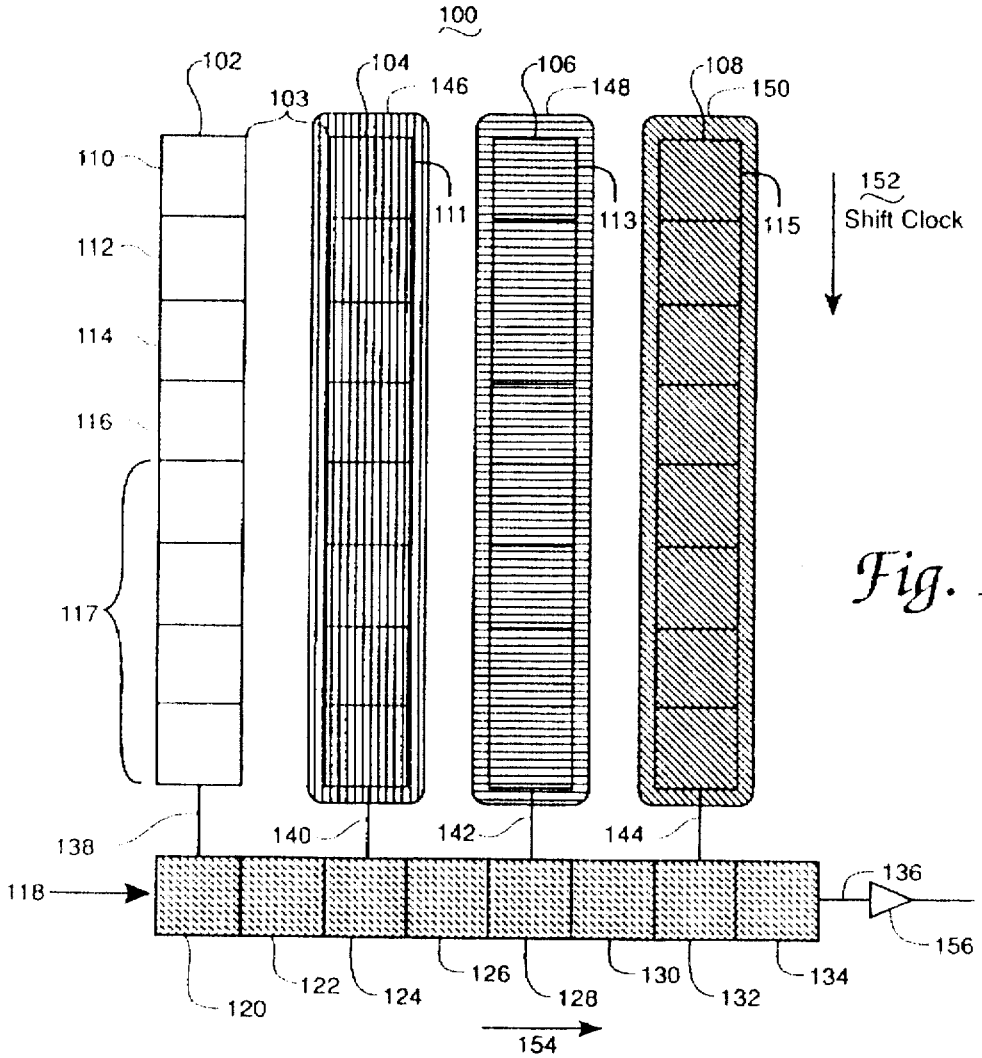
FIG. 1 shows a charge coupled device array and related apparatus as may be used in the present invention.

FIG. 1 in the drawing shows a frame transfer charge coupled device (CCD) array as may be employed in the present invention. The FIG. 1, CCD 100 is shown to include four columns 102, 104, 106 and 108 of CCD transducer sites, with individual transducer sites being indicated at 110, 112, 114, and 116 in the column 102, for example. Each of the sites 110, 112, 114, and 116 is of course capable of generating an electrical charge signal responding to the intensity and duration of an optical image pixel impinging on the site. The FIG. 1 sites are of course shown in an exaggerated size or magnified form, a typical site being on the order of 10 micrometers (μm)×10 μm in an actual CCD array.

In addition to the ability of each site 110, 112, 114, and 116 to act as optical-to-electrical transducers, these sites are, as is implied by the CCD name of the FIG. 1 apparatus, associated in a physical manner on a semiconductor chip so as to enable the transfer of electrical charge between adjacent transducer sites—transfer under the control of a charge shifting clock which is usually of a multiple phase nature. It is significant to note that, depending on the CCD array design, some of the FIG. 1 sites, for example, the sites 112, 116 and so on, may be rendered inactive to photo energy to enable charge separation and thus charge transfer.

As is implied by the adjacent relationship between the transducer sites 110 and 112 for example, the FIG. 1 CCD array contemplates site-to-site charge transfer in the downward direction, along with an absence of horizontally transferred charge—except of course for the readout register portion of the FIG. 1 array, which is indicated at 118.

This dual function capability of the CCD array transducer sites 110 and 112, that is the site capability of transducing optical energy into an electrical charge signal and the ability to store and communicate this electrical charge signal to adjacent transducer sites, is of course a major aspect of a CCD array. This storage and shifting capability is especially useful in camera applications of the CCD array 100.

In some arrangements of the FIG. 1 CCD array, a portion of the transducer sites in each of the columns may be covered by an optical energy excluding film so as to make such a portion of the transducer sites in each column, the lower four sites 117 for example, unresponsive to incident optical energy and useful exclusively for storing electrical charge signals received from the other transducer sites 110, 112, 114, and 116 for examples. Such an array using an opaque mask is commonly referred to as a frame transfer CCD. Without an opaque mask the array is commonly referred to as a full frame CCD. The best mode of operation of the present invention is envisioned to utilize a full frame CCD array, however.

In the FIG. 1 CCD array however, it is contemplated that all of the eight transducer sites in each column are usable for both optical energy to electrical charge transducing purposes and for storage of downwardly shifted charge signals representing previously received image pixels.

Figure 3:
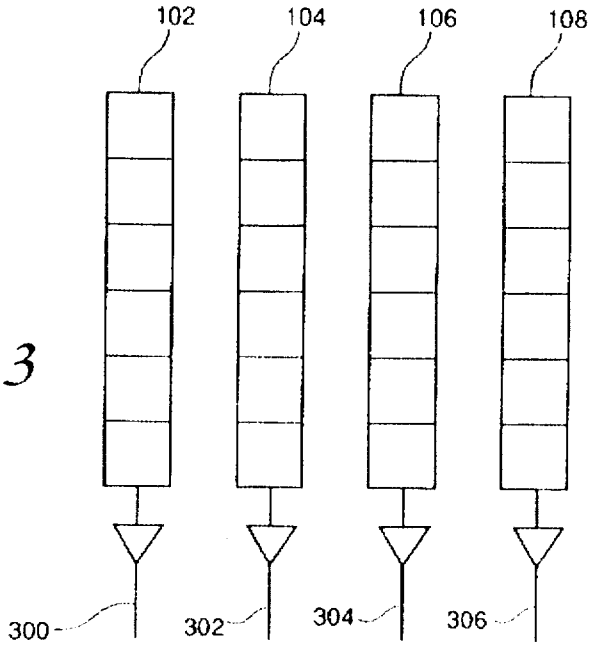
FIG. 3 shows an alternate parallel readout form of the FIG. 1 array.

The lower most portion of the FIG. 1 CCD, the readout register 118, is however, presumed to be of the electrical storage-only characteristic and thereby to be capable of assembling and outputting along the path 136, an ongoing sequence of signal charge packets. One group of such signal charge packets represents the image pixels transduced by the horizontally adjacent transducer sites 110, 111, 113, and 115 for example. The paths 138, 140, 142 and 144 which couple the transducer columns to the storage and readout register 118 may be either of a charge transfer or an actual electrical signal communicating nature. These paths may in fact be used for direct parallel readout of the signals from each column versus use of the storage and readout register shown in FIG. 1. A parallel readout CCD array of this type is shown in FIG. 3 of the drawings where the columns of CCD sites are shown at 102, 104, 106 and 108 and the parallel disposed readout amplifiers are indicated by the numbers 300, 302, 304, and 306.

The signal charge packets received from the columns 102, 104, 106, and 108 in the FIG. 1 arrangement of the invention are of course stored in the output register pixel locations 120, 124, 128, and 132. The intervening pixel locations 122, 126, 130, and 134 in the register 118 are used for charge separation and transfer in the FIG. 1 CCD. Readout of the register 118 signal along the path 136 is of course accomplished under control of a clock signal which is indicated at 154, a clock which is also preferably of the multi-phased type. The transfer of image pixel determined charge quantities between individual transducer sites in each column of the CCD array 100, that is, between the transducer sites 110, 112, and 114 for example, is also under the control of a clock signal which is indicated at 152 and which is again preferably of the multiple phased nature.

The relatively close spacing of the transducer sites 110 and 112 for example, in the column 102 of the FIG. 1 CCD and the potential for having no more than one transducer dimension of separation in the gap 103 between adjacent columns leads to one of the well-known attributes of a CCD, that is its capability of providing relatively large transducer sites which result in high array sensitivity and high fill factor characteristics for a CCD array. Actually, the separation gap 103 between adjacent columns of a CCD array may in fact be as small as 5 μm or smaller in furtherance of this large pixel high sensitivity and high fill factor characteristic. Other configurations of optical-to-electrical transducer imaging arrays such as the interline CCD array and the charge injection device (CID) array are somewhat less productive of these large pixel and high fill factor characteristics. CCD arrays are often provided with channel stops located in the space 103 between adjacent columns 102 and 104 in order to reduce blooming effects however, these structures also tend to limit the large pixel and high fill factor capabilities of the device.

The FIG. 1 CCD array 100 may be provided with color image capability—with a sacrifice of some resolution, by including optically selective filters as are indicated at 146, 148 and 150 for adjacent columns of transducer sites. The filter 146 might be of a red transmitting characteristic, the filter 148 of a blue transmitting characteristic and the filter 150 of a green transmitting characteristic for example, in order that the FIG. 1 CCD array conform to the color transmission arrangement used in current television systems.

Figure 4:
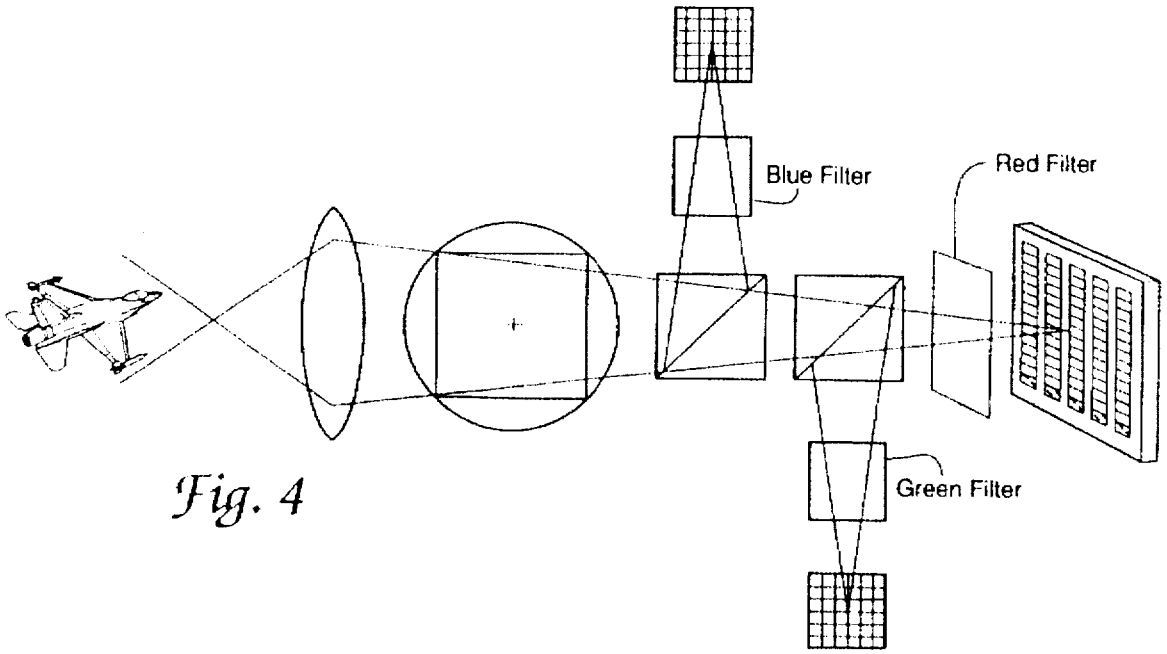
FIG. 4 shows an alternate arrangement for detecting color as may be employed in the invention.

The FIG. 1 CCD array 100 may also be provided with color image capability through use of another technique. Here the image is transmitted and split into two multiple beam components by one or more optical beamsplitter elements with each beam component being transmitted through an optical color filter and then onto a CCD array (see FIG. 4). This technique is also shown in FIG. 4 of the drawings and prevents the loss of resolution encountered in the FIG. 2 arrangement of the invention.

Returning to the dual capabilities of the individual transducer sites 110 and 112 in the array 100, this dual transducer and storage capability also gives rise to the hereinconsidered characteristic of some difficulty with solid state imagers. This characteristic, smearing, relates to the continuation of charge buildup during readout of the CCD transducer array. Smearing might occur for example, if either of the transducer sites 110 or 112 continues to receive optical illumination while electrical charge is being transferred between these sites for eventual readout via the register 118.

Several difficulties arise with previous anti-smear arrangements including the undesirability and instability of mechanical elements such as a shutter and the many transfers required of charge from a distal transducer site 110 for example, before its arrival in the register 118. Each of these transfers is of course required at a fast clock rate, especially when no shutter is used, if smear is to be reduced to acceptable levels. Inherent inductances and capacitances, however, together with large clock circuit transient current requirements tend to limit the upper range of clock frequencies usable in a FIG. 1 type of apparatus. It is worthy of mention that these conventional anti-smear arrangements can nevertheless be used in conjunction with the present invention.

Figure 2:
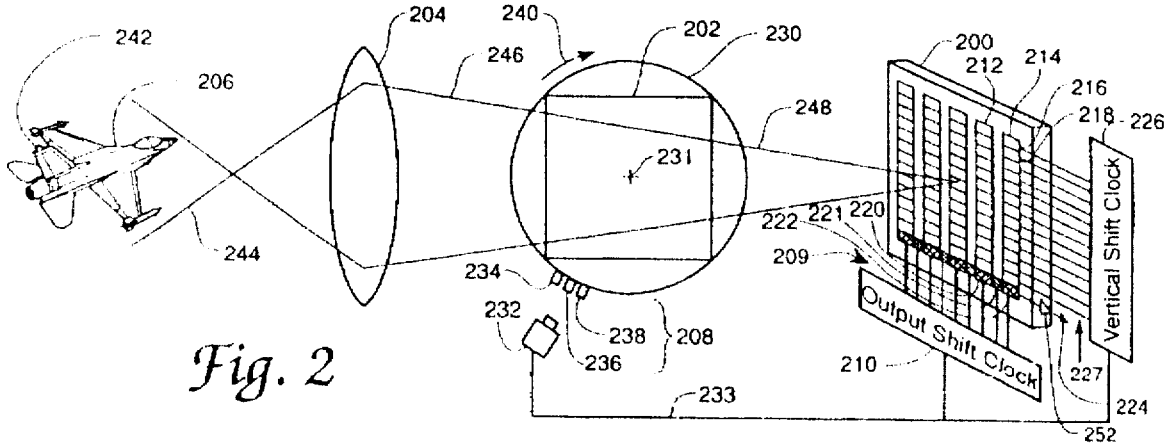
FIG. 2 shows a charge coupled device array in combination with other elements of the invention and a representative optical input image.

FIG. 2 in the drawings shows an arrangement according to the present invention which may be used to overcome the smear difficulty in a CCD array equipped video camera. In the FIG. 2 apparatus a CCD array 200 is shown to receive an optical image of an object, such as the aircraft 206, by way of a lens assembly represented at 204 and a movable optical member such as the rotating prism 202. The rotating prism 202 is also provided with a position sensing apparatus which is generally indicated at 208 in order that one of the principal aspects of the FIG. 2 apparatus, that is, movement of the CCD image in synchronism with charge readout from the array be achieved.

In the FIG. 2 apparatus, the CCD array 200 is shown to include a plurality of columns, 212 and 214 for example, of individual transducer sites or pixels—sites which are indicated typically at 216 and 218. Each of the columns in the CCD array 200 is presumed to terminate, at its lower end with a horizontally coupled plurality of shift register storage sites as were described in FIG. 1. Two of these shift register sites are indicated at 220 and 222 in FIG. 2; the signal from the shift register is obtained on the path 224 by way of the amplifier 252. The signal from the path 224 is additionally processed as by the addition of synchronizing pulses and adjustment of its dynamic range to a predetermined signal band, for example, to provide the desired output format. The shifting of optical image data charge between transducer sites in each column of the CCD array 200 is controlled by vertical shift clock signals which travel along the multiple paths 227 from the clock generator 226. Shifting of the column charge signals along the shift register sites 220, 221, and 222 and onto the output signal path 224 is under the control of an additional output shift clock generator 210 as is also shown in FIG. 2. Alternatively, this readout can be done in parallel as shown in FIG. 3 instead of using the shift register sites indicated at 220, 221 and 222.

As indicated above, the movable optical member at 202 is preferably embodied in the form of a rotating optical prism, a prism which is typically represented by the square 202 and which rotates about the horizontally disposed axis indicated at 231. The prism 202 is preferably disposed on a supporting element 230 during this rotation. The supporting element 230 is provided with index tooth members (or alternately light emitting diode reflectors) as are indicated typically at 234, 236 and 238 in FIG. 2. Position of the optical prism 202 is thereby precisely known to the vertical shift clock generator 226 and the vertical shift clock pulses along the paths 227 are precisely synchronized with the position of the prism 202. Signals from the series of tooth members 234, 236 and 238 are conveyed to the vertical shift clock generator 226 along the path 233 upon generation in the pick-up 232. These same signals from the path 233 are also applied to the output shift clock 210 in order that data readout on the path 224 can be synchronized with the vertical shift clock and rotation of the prism 202.

The pick-up 232 may be of the magnetic, optical or other type of position sensor, as is available in the electronic art. Rotation of the prism 202 is indicated at 240 in FIG. 2, with this rotation being centered about the horizontally disposed axis 231 in order that vertically-oriented image movement in the typical columns 212 and 214 of the CCD array 200 be accomplished. Other arrangements of a rotating element and the CCD array may of course be accomplished within the spirit of the invention. It is important to note that the rotational velocity of the prism 202 and readout of the CCD array may be adjusted to provide whatever frame rate is desired within the limitations of the apparatus.

The optical lens, 204 in FIG. 2 represent a lens assembly which may include multiple lens elements and other optical elements as may be useful for collecting optical energy from a viewed scene or object, such as the aircraft 206, into the optical path portions 244, 246 and 248 and onto the transducer site elements of the CCD array 200. The lenses of the assembly represented at 204 are arranged to focus an image from the aircraft 206 onto the surface of the CCD array 200 according to conventional optical principles. The path portion 248 is of course displaced into a more upwardly directed or more downwardly directed alignment according to the rotational position of the prism 202. For discussion purposes it is convenient to consider a point on the aircraft 206, a point such as the marker lamp 242, as being representative of the aircraft 206 for image processing in the FIG. 2 arrangement of the invention.

During operation of the FIG. 2 apparatus, in accordance with the present invention, it is desired for the focused image of the aircraft 206 to be projected onto the facial transducer site surface of the CCD array 200 with the marker light 242 point source, appearing initially for example, on the transducer site 216. Operation of the FIG. 2 apparatus further contemplates that rotational movement of the prism 202 successively displaces this point source image to the transducer site 218 and so on down the column 214. This movement of the marker light image between successive transducer sites is moreover exactly synchronized with the vertical shift clock 210 induced transfer of charge between transducer sites in the column 214. According to this concept, the marker light 242 point source will therefore first cause the accumulation of electrical charge in the transducer site 216, and then in the site 218 and so on in each of the 13 active transducer sites of column 214 until the total accumulated charge is ultimately read from the shift register site storage location 222.

The transfer of charge accumulated in the transducer site 216 to the transducer site 218, since it occurs in exact synchronism with movement of the optical image representing the point source 242, does not incur the smear accumulation of undesirable charge as would occur in a non-synchronized image and charge movement arrangement—an arrangement wherein other undesired portions of the aircraft could be imaged on one of the transducer sites 216 and 218 during the charge transfer sequence.

The signal finally transferred into the shift register site 222 in this operating arrangement of the FIG. 2 apparatus is the sum total of the charge accumulated in each of transducer sites 216, 218 and so on in the column 214. This accumulation occurs during successive appearances of the image from the point source 242 on the transducer sites of column 214. This sum total of the accumulations in column 214 implies of course, that each of the transducer sites in the column 214 is active in production of charge signal read from the shift register bit 222. By way of this multiple site contribution to the final signal individual differences between the transducer efficiency of individual sites in the column 214 tends to be averaged out and of less consequence than in other possible use arrangements for the CCD array 200.

The recently appearing surface acoustic wave charge transfer device (SAW-CTD) may be employed in the present invention as an alternative for the CCD array 200. Devices of this type are described in the article "Streak and Framing Camera Designs Using Surface Acoustic Wave Charge-Transfer Devices" which appears in the periodical *Optical Engineering*, Vol. 25, No. 12, pages 1267–1277, December 1986. This article is hereby incorporated by reference herein.

In a SAW related device a traveling surface acoustic wave creates electrical potential wells which travel with the acoustic wave and also extend into the adjacent semiconductor material. Optical energy responsive minority carriers from the semiconductor material can be injected into these potential wells and then travel toward a signal collection point with the wave.

The moving image readout arrangement of the present invention is especially helpful with respect to removing the blurring or smearing effect which is encountered when a CCD array is used in the conventional "staring" mode of operation. In fact, the smearing effect is essentially eliminated from the FIG. 2 apparatus as long as the intra-scene movement of the image is small in comparison with the frame rate of the apparatus. To explain this characteristic, it is helpful to consider again the marker lamp 242. If, for example, this lamp is initially focused on transducer site 216, then during readout of one frame this point source image will intentionally be displaced down column 214. However, large intra-scene (within one frame) movement of this point source image may result in it undesirably moving to column 212 and to other columns before the end of the readout of one frame, thus causing smear. As long as this type of movement is absent, therefore, the effect of smearing is essentially eliminated in the present invention.

The FIG. 2 apparatus can also be used with solid state imagers in which the vertical column is one continuous pixel or in arrangements wherein the imager is one large pixel. The above-described SAW-CTD is of this nature. In the above recited published article, FIG. 1 consists of one large pixel and FIG. 13 consists of several rows (or columns) of long pixels. The moving optical element, i.e., the rotating prism, of the present invention as shown in FIG. 2, for example, can therefore be combined with this one large pixel or several rows or columns of long pixels concept to provide smear-free images.

In each of these imaging instances, the electrical readout arrangement is necessarily of such operating speed, as to enable charge readout at a rate faster than the time for charge diffusion in order to preclude significant blurring of the output image. Considering again the one large pixel concept, when an image is focused on the surface of such a device, photons are converted to electrons which are "stored" where they are created. However, as time passes, the mutual repulsion of the electrons caused by their negative charge will cause electrons to move about or diffuse in this pixel until electrons are uniformly distributed. As this diffusion occurs, the picture information is blurred more and more until it is totally lost. A fast readout can therefore be used to avoid this effect.

In an ultimate arrangement of the invention the array 200 may be used in a time-domain-integration operating mode. In this operating mode a transducer site is used to stare at a particular point or area in the field of view for a predetermined amount of time and then the transducer sites are read out at a rate which enables the desired integration time. In this arrangement, much of the FIG. 2 apparatus is arranged as described above however, the utilization of this apparatus is accomplished in a different manner. In this arrangement of the invention, the rotation speed of the prism is selected so that the time to read out one frame equals the desired integration time in a time-domain-integration application. In short, therefore, the frame rate can be adjusted to suit various applications.

Figure 5:
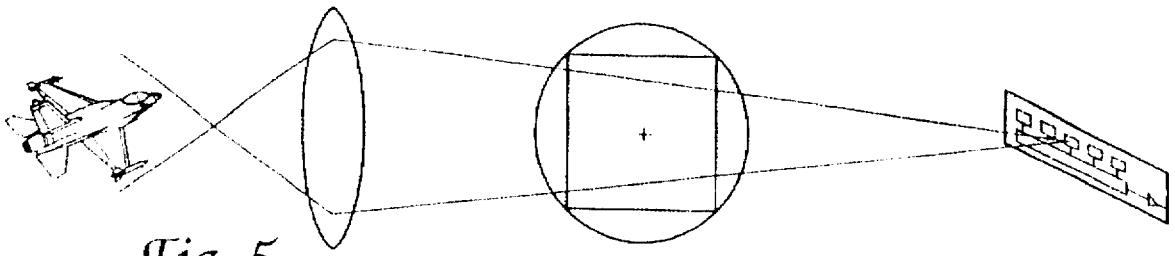
FIG. 5 shows a linear detector semiconductor array and related apparatus as may be used in an alternate form of the invention.

Another arrangement of the invention utilizes a linear array detector as shown in FIG. 5 instead of the CCD array. In this arrangement, synchronism of movement of the optical image with readout of the linear array is not necessary since there is no shifting of charge between active pixels. Readout of the linear array can be accomplished by using a shift register as previously described. The linear array data can also be obtained by continuous analog readout or sampled readout of each site in parallel as shown in FIG. 3.

The detectors at the sites in the FIG. 5 linear array can be of the CCD, CID or other types. The advantages of using a linear array as in FIG. 5 are twofold. First, as previously disclosed, a continuous analog readout can be used. This is significant because it provides an analog resolution which is much higher than sampled resolution. Second, a linear array can be fabricated with higher yield rates than a CCD area array because yield rates are directly related to the area required by the integrated circuitry.

The FIG. 5 arrangement can be extended a step further to a configuration wherein a single detector site is used in conjunction with a rotating prism. Much of the above linear array information applies to this arrangement. In this arrangement a readout device having an optically obscured site as in the FIG. 1 shift register is not needed. This arrangement, however, does not provide an image output but only one line of an image.

While the apparatus and method herein described constitute a preferred embodiment of the invention, it is to be understood that the invention is not limited to this precise form of apparatus or method and that changes may be made therein without departing from the scope of the invention which is defined in the appended claims.

What is claimed is:

1. The method for producing electrical signals representing an optical input image comprising the steps of:

focusing said optical input image onto a photosensitive retina of a charge coupled device array, said photosensitive retina comprising a plurality of columns of optical to electrical signal transducer sites;

moving said focused image along a lengthwise total dimension of said columns of transducer sites toward an electrical signal readout site portion for each said column, said moving step including rotating homogeneous optical prism deflecting of said focused image between successive transducer sites from a first site to said readout site in each of said columns;

transferring translated optical signal generated quantums of electrical charge, representing pixels of said optical input image, between illuminated lengthwise adjacent transducer sites in said columns, said transferring progressing toward said electrical signal readout site in synchronism with said image moving;

reading said electrical signals from said readout sites in each said column in predetermined order; and processing said readout electrical signals into a predetermined output signal format.

2. The method of claim 1 wherein said transferring step includes generating a transducer site to transducer site transferring clock signal in response to sensed instantaneous positions of said rotating optical prism.

3. The method of claim 2 wherein said reading step includes shifting said electrical charge signals from said electrical signal readout sites located in a plurality of said columns in a shifting clock accessed serial group of signal charge packets.

4. The method of claim 3 further including the steps of:

reading electrical signal from a final transducer site in each said column in a row organized readout; and optically shielding said final transducer sites from row readout attending additional optical signal input smearing.

5. The method of claim 4 wherein said focusing step also includes transmitting said optical input image through a plurality of color selective filters disposed over predetermined columns of sites in said photosensitive portion.

6. The method of claim 4 wherein said focusing step includes transmitting said optical input image through an optical beamsplitter element and an adjacent color selective filter.

7. Video camera apparatus comprising the combination of:

a charge coupled device semiconductor array having a plurality of predetermined orientation aligned columns of optical photon to electrical charge signal transducing pixel points dispersed over an image reception surface portion thereof;

optical means for focusing a camera input optical image on an image reception surface portion of said charge coupled device semiconductor array;

optical displacement means located intermediate said optical means for focusing and said image reception surface for moving said focused camera input optical image along the lengthwise extent of said column pixel points and toward a predetermined electrical signal readout location therein;

electrical shifting means synchronized with said optical displacement means for transferring electrical charge signals representing said camera input optical image between illuminated successive pixel points in each said column of said image reception surface toward said predetermined electrical signal readout location; and means for communicating said column charge signals from said readout location into a video signal utilizing apparatus.

8. The video camera apparatus of claim 7 wherein said optical displacement means comprises a homogeneous optical prism rotating about a cross sectional centroid thereof.

9. The video camera apparatus of claim 8 wherein said optical prism is rotated at a predetermined fixed rate of revolution.

10. The video camera apparatus of claim 9 wherein said electrical shifting means includes electrical clock pulse signal generator means for generating a shifting clock signal synchronized with said optical prism movement.

11. The video camera apparatus of claim 10 further including means for determining said rate of revolution and said shifting clock rate in response to a selected image frame rate.

12. The video camera apparatus of claim 7 further including optical filtering means of predetermined color signal response characteristics for segregating optical signals received in adjacent columns of said pixel points according to color.

13. The video camera apparatus of claim 7 further including a charge signal storage pixel location for each said column of pixel points and wherein said charge signal storage pixel location for each said column comprises an additional of said pixel points located in each said column of pixel points and shielded from smear generating optical signal input energy in a row readout sequence.

14. The video camera apparatus of claim 7 wherein:

said optical means for focusing includes optical lens means for focusing said optical image through said optical prism onto said image reception surface; and said charge coupled device is a full frame charge coupled device.

15. Video camera apparatus comprising the combination of:

a semiconductor detector member having a parallel columns of elements disposed optical photon to electrical signal transducing image reception surface;

optical means for focusing a camera input optical image on said detector member image reception surface;

rotationally driven homogeneous prism optical image displacement means located intermediate said optical means for focusing and said image reception surface for continuously moving said focused camera input optical image over column lengths of said image reception surface toward a predetermined region of electrical readout located therein; and means for transferring, in synchronism with said image moving, an electrical signal responsive to successive portions of said optical image into successive later scanned column portions of said detector member and thence into a video signal utilizing apparatus.

16. The camera apparatus of claim 15 wherein:

said detector member column elements comprise a plurality of optical photon to electrical charge signal transducing pixel points; and said homogeneous prism optical image moving includes electrical signal charge readout during illumination of said transducing pixel points by said focused camera input optical image.

17. The camera apparatus of claim 15 wherein said detector member comprises a surface acoustic wave device having an optical photon to electric charge conversion characteristic.

* * * * *